Oct. 17, 1967  J. E. BOLYARD  3,347,562
TRAILER HITCH
Filed Oct. 22, 1965
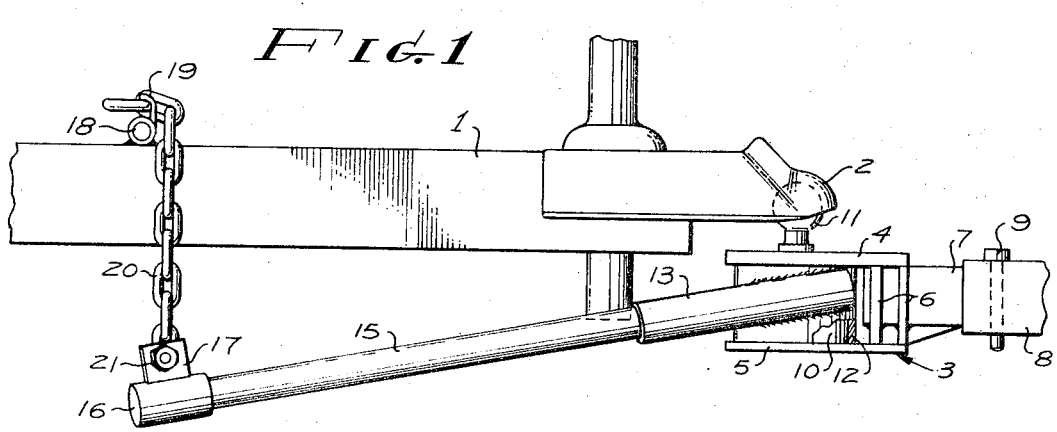
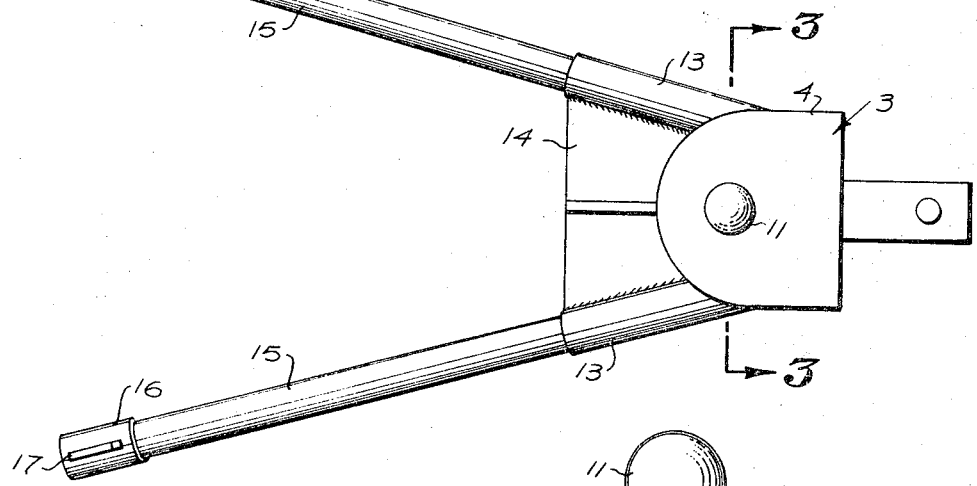
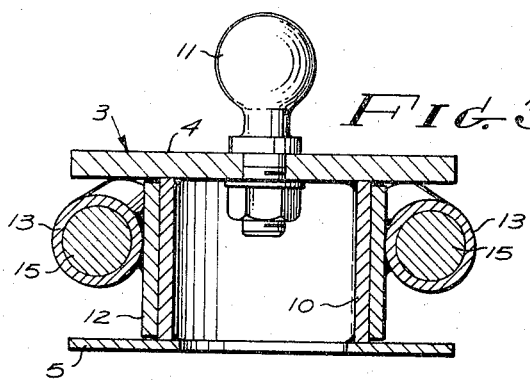
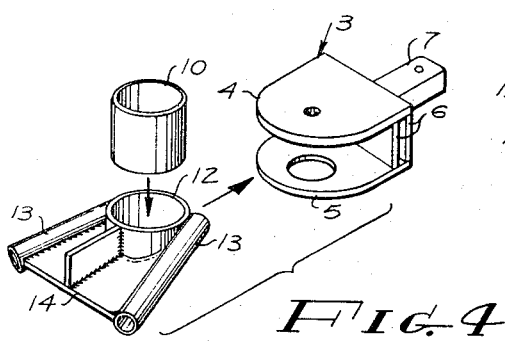
JOSEPH E. BOLYARD
INVENTOR.
BY
ATTORNEYS

United States Patent Office 3,347,562
Patented Oct. 17, 1967

3,347,562
TRAILER HITCH
Joseph E. Bolyard, % Bolyard Distributing Co.,
14733 Cohasset St., Van Nuys, Calif. 91405
Filed Oct. 22, 1965, Ser. No. 501,243
3 Claims. (Cl. 280—406)

ABSTRACT OF THE DISCLOSURE

A hitch for connecting a towing vehicle and trailer which provides a welded yoke underlying a pivot ball for attachment to a trailer hitch; the yoke including spaced plates and a welded journal sleeve around which is permanently retained a sleeve bearing. Welded to the sleeve bearing is a pair of diverging, tubular sockets which receive spring arms arranged to be adjustably attached to the trailer.

---

This invention relates to trailer hitches and included in the objects of this invention are:

First, to provide a trailer hitch which counteracts the tendency of the connection between a towing vehicle, especially a passenger automobile, and a trailer, such as a camping or house trailer, to sag; whereby the towing vehicle and trailer are maintained relatively level and ground clearance is maintained.

Second, to provide a trailer hitch which utilizes a special sleeve bearing located below a ball and socket connection between the towing vehicle and trailer and from which extend a pair of diverging spring arms adapted for connection to the trailer, the sleeve bearing, while permitting pivotal movement about a vertical axis, passing through ball and socket connection, also providing sufficient resistance to pivotal movement to damp out any tendency of the trailer to sway from side-to-side or to rock about a transverse axis.

With the above and other objects in view as may appear hereinafter, reference is directed to the accompanying drawings in which:

FIGURE 1 is a side view of the trailer hitch showing fragmentarily adjacent portions of the towing vehicle and trailer.

FIGURE 2 is a plan view of the trailer hitch.

FIGURE 3 is an enlarged transverse sectional view thereof taken through 3—3 of FIGURE 2.

FIGURE 4 is an exploded view shown in perspective.

The trailer hitch is adapted to be used in connection with a trailer having a trailer frame 1 which converges forwardly to an apex and is provided at the apex with a hitch socket 2.

The trailer hitch includes a mounting structure 3 having a top plate 4 and a bottom plate 5 joined along one margin by a pair of webs 6 so that the mounting structure is essentially U-shaped inside aspect.

The webs 6 support a horizontally extending mounting bar 7 preferably square in cross section and adapted to be inserted in a supporting tube 8 secured to and projecting rearwardly from a towing vehicle, not shown. The mounting bar is secured in place by a removable pin 9 or other conventional attachment means.

Secured between the top and bottom plates 4 and 5 is a cylindrical journal member 10. The journal member is smaller than the plates so that the plates form a flange above and below the journal member. Mounted on the top plate 4 is a hitch ball 11.

The journal member receives a bearing sleeve 12. Welded to opposite sides of the bearing sleeve is a pair of socket members 13 in the form of elongated tubes. The socket members diverge rearwardly and slope downward at a slight angle. The socket members are preferably joined by a reinforcing web 14.

Each of the socket members receives a tubular spring arm 15. The spring arms extend under the converging sides of the trailer frame and receive at their extremity, cap members 16 having upwardly directed tongues 17.

The trailer frame is provided with a transversely extending attachment bar 18 having a hook 19 near each extremity. A chain 20 is secured by a bolt 21 to each tongue 17. The chains are adapted to be engaged by the hooks 19.

Operation of the trailer hitch is as follows:

The towing vehicle and trailer are connected in a conventional manner by placing the hitch socket 2 over the hitch ball 11. The spring arms are then biased upwardly by pulling upwardly on the chains 20 and hooking them over the hooks 19.

The upward force applied to the trailer spring arms is calculated to bring the towing vehicle and trailer into essentially horizontal relation, offsetting the tendency of the trailer to tilt forwardly and the towing vehicle to tilt backwardly. This is accomplished by the action of the spring arms 15. The bearing connection between the journal member 10 and bearing sleeve 12 is not intended to be free, but to provide a limited amount of resistance so that any tendency of the trailer to sway sideways is damped; however, the friction between the journal member or the plates and the ends of the bearing sleeve is not sufficient to interfere with the necessary angular movement about the axis of the journal member when the vehicle and trailer member are moved in a curved path.

It will be noted that the angular movement of the spring arms is about the axis of the journal member 10 and ball 11 so that in vertical aspect the extended ends of the arms remains in essentially fixed relation with the points of attachment to the trailer frame; that is, there is no appreciable backward and forward or lateral displacement of the extended ends of the arms when the trailer and towing vehicle are in angular relation.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:

1. A hitch for connecting a trailer having a forwardly converging frame and a hitch socket at the apex thereof, to a towing vehicle, said hitch comprising:
   (a) a mounting structure including upper and lower plate members, a cylindrical journal disposed between and joining said plate members, a web at one side of said journal and also joining said plate members;
   (b) means for securing said web to said towing vehicle;
   (c) a ball member secured to said upper plate member in coaxial relation to said journal and adapted to receive said hitch socket;
   (d) a sleeve received on said journal for rotation about an essentially vertical axis passing through the center of said ball member;
   (e) a pair of diverging spring arms secured to said sleeve;
   (f) and means for applying an upward bias to said spring arms and securing said spring arms to said converging frame.

2. A hitch for connecting a trailer having a forwardly converging frame and a hitch socket at the apex thereof, to a towing vehicle, said hitch comprising:
   (a) a mounting structure including upper and lower plate members, a cylindrical journal disposed between and joining said plate members, a web at one side of said journal and also joining said plate members;

(b) means for securing said web to said towing vehicle;

(c) a ball member secured to said upper plate member in coaxial relation to said journal and adapted to receive said hitch socket;

(d) a sleeve received on said journal for rotation about an essentially vertical axis passing through the center of said ball member;

(e) a pair of socket members secured to opposite sides of said sleeve and defining diverging axes located in a common plane sloping downwardly therefrom at a slight angle to a horizontal plane;

(f) a pair of tubular spring arms received in said socket members;

(g) and means for applying an upwardly biasing force to said spring arms and for connecting the extremities to said trailer.

3. A hitch for connecting a trailer having a forwardly converging frame and a hitch socket at the apex thereof, to a towing vehicle, said hitch comprising:

(a) a rearwardly directed shaft adapted for connection to said towing vehicle;

(b) a U-shaped yoke including an upper plate, a lower plate, at least one web joining said plates and also joined to said shaft, and cylindrical journal of greater diameter than axial length also joining said plates, said shaft plates, web and journal being welded together;

(c) a cylindrical bearing sleeve permanently mounted on said journal between said plates;

(d) a pair of socket members welded to said bearing sleeve in diverging relation;

(e) a pair of diverging, tubular spring arms received in said socket members;

(f) a ball member secured to the upper plate of said yoke in concentric relation to said journal and bearing sleeve, said ball member adapted to receive said hitch socket;

(g) and means for connecting said spring arms under tension to said converging frame.

References Cited

UNITED STATES PATENTS

| | | | |
|---|---|---|---|
| 2,597,657 | 5/1952 | Mathisen | 280—406 |
| 2,738,206 | 3/1956 | Loughner | 280—461 |
| 2,793,878 | 5/1957 | Toland | 280—406 |
| 2,863,673 | 12/1958 | Lisota | 280—406 |
| 2,952,475 | 9/1960 | Reese | 280—406 |

LEO FRIAGLIA, *Primary Examiner.*